US008457882B2

(12) United States Patent
Pyne et al.

(10) Patent No.: US 8,457,882 B2
(45) Date of Patent: Jun. 4, 2013

(54) SYSTEMS AND METHODS FOR NAVIGATION IN A GPS-DENIED ENVIRONMENT

(75) Inventors: Michael Pyne, Albuquerque, NM (US); Steven Martinez, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 143 days.

(21) Appl. No.: 13/089,493

(22) Filed: Apr. 19, 2011

(65) Prior Publication Data

US 2012/0271546 A1   Oct. 25, 2012

(51) Int. Cl.
*G01C 21/30* (2006.01)

(52) U.S. Cl.
USPC ........................................................ 701/418

(58) Field of Classification Search
USPC ................. 701/411, 412, 417, 418, 442, 446, 701/448; 340/995.14, 995.15, 995.16, 995.17, 340/995.25, 995.28
See application file for complete search history.

(56) References Cited

U.S. PATENT DOCUMENTS

| 5,566,073 | A | * | 10/1996 | Margolin | 701/454 |
| 5,904,724 | A |   | 5/1999 | Margolin | |
| 5,995,903 | A | * | 11/1999 | Smith et al. | 701/470 |
| 6,219,594 | B1 | * | 4/2001 | Nicosia et al. | 701/16 |
| 7,089,092 | B1 | * | 8/2006 | Wood et al. | 701/14 |
| 7,295,901 | B1 | * | 11/2007 | Little et al. | 701/16 |
| 7,852,236 | B2 | * | 12/2010 | Feyereisen et al. | 340/971 |
| 2002/0019701 | A1 | * | 2/2002 | Miller | 701/214 |
| 2003/0125875 | A1 | * | 7/2003 | Lee | 701/221 |
| 2003/0132860 | A1 | * | 7/2003 | Feyereisen et al. | 340/973 |
| 2003/0184450 | A1 | * | 10/2003 | Muller et al. | 340/963 |
| 2006/0247855 | A1 | * | 11/2006 | de Silva et al. | 701/212 |
| 2009/0040070 | A1 | * | 2/2009 | Alter et al. | 340/945 |
| 2009/0207048 | A1 | * | 8/2009 | He et al. | 340/973 |
| 2010/0063730 | A1 |   | 3/2010 | Case et al. | |
| 2010/0082187 | A1 | * | 4/2010 | Nichols et al. | 701/16 |
| 2010/0103040 | A1 | * | 4/2010 | Broadbent | 342/357.14 |
| 2010/0268458 | A1 |   | 10/2010 | Becker et al. | |
| 2010/0274434 | A1 | * | 10/2010 | Donnelli et al. | 701/29 |
| 2011/0128183 | A1 | * | 6/2011 | Marshall | 342/357.29 |
| 2011/0195667 | A1 | * | 8/2011 | Hassan et al. | 455/62 |

FOREIGN PATENT DOCUMENTS

WO   WO 2010015854 A1 *   2/2010

* cited by examiner

*Primary Examiner* — Khoi Tran
*Assistant Examiner* — Adam Mott
(74) *Attorney, Agent, or Firm* — Fogg & Powers LLC

(57) ABSTRACT

Systems and methods for updating a navigation system are provided. In one implementation, a system includes: a navigation system configured to provide a navigational solution; at least one memory device configured to store a terrain object database, the terrain object database storing information that describes a terrain; a user interface configured to display a terrain model and receive position adjustments from a user; and a processing unit configured to generate displayable information for displaying the terrain model using the information stored on the at least one memory device and the navigational solution, and calculate corrections to the navigational solution from the position adjustments and transmit the corrections to the navigation system.

20 Claims, 4 Drawing Sheets

SYSTEMS AND METHODS FOR NAVIGATION IN A GPS-DENIED ENVIRONMENT

BACKGROUND

Because of the availability of the Global Positioning System (GPS), vehicles rely on satellite navigation systems for position information. However, with the increasing reliance on these satellite navigation systems, the vehicles become increasingly vulnerable to GPS failure and/or spoofing of a satellite signal. Without an alternative system to a GPS-based navigator, the loss of a GPS signal and the commensurate loss of position information can lead to position inaccuracy which can result in mission failure and, in a worst case scenario, the loss of a platform and life. To solve the problem of operating in a GPS-denied environment, some systems integrate GPS with a variety of supplemental sensors such as inertial sensors, radio navigation aids, optical scene correlators (e.g. Digital Scene Matching Correlator (DSMAC)), radar/terrain correlators (e.g., Precision Terrain Aided Navigation (PTAN)), and the like. However, these supplemental sensors can be prohibitively expensive and unavailable for certain vehicles.

SUMMARY

The Embodiments of the present invention provide systems and methods for navigation in a GPS-denied environment and will be understood by reading and studying the following specification.

In one embodiment, systems and methods for updating a navigation system are provided. In one implementation, a system includes: a navigation system configured to provide a navigational solution; at least one memory device configured to store a terrain object database, the terrain object database storing information that describes a terrain; a user interface configured to display a terrain model and receive position adjustments from a user; and a processing unit configured to generate displayable information for displaying the terrain model using the information stored on the at least one memory device and the navigational solution, and calculate corrections to the navigational solution from the position adjustments and transmit the corrections to the navigation system.

BRIEF DESCRIPTION OF DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
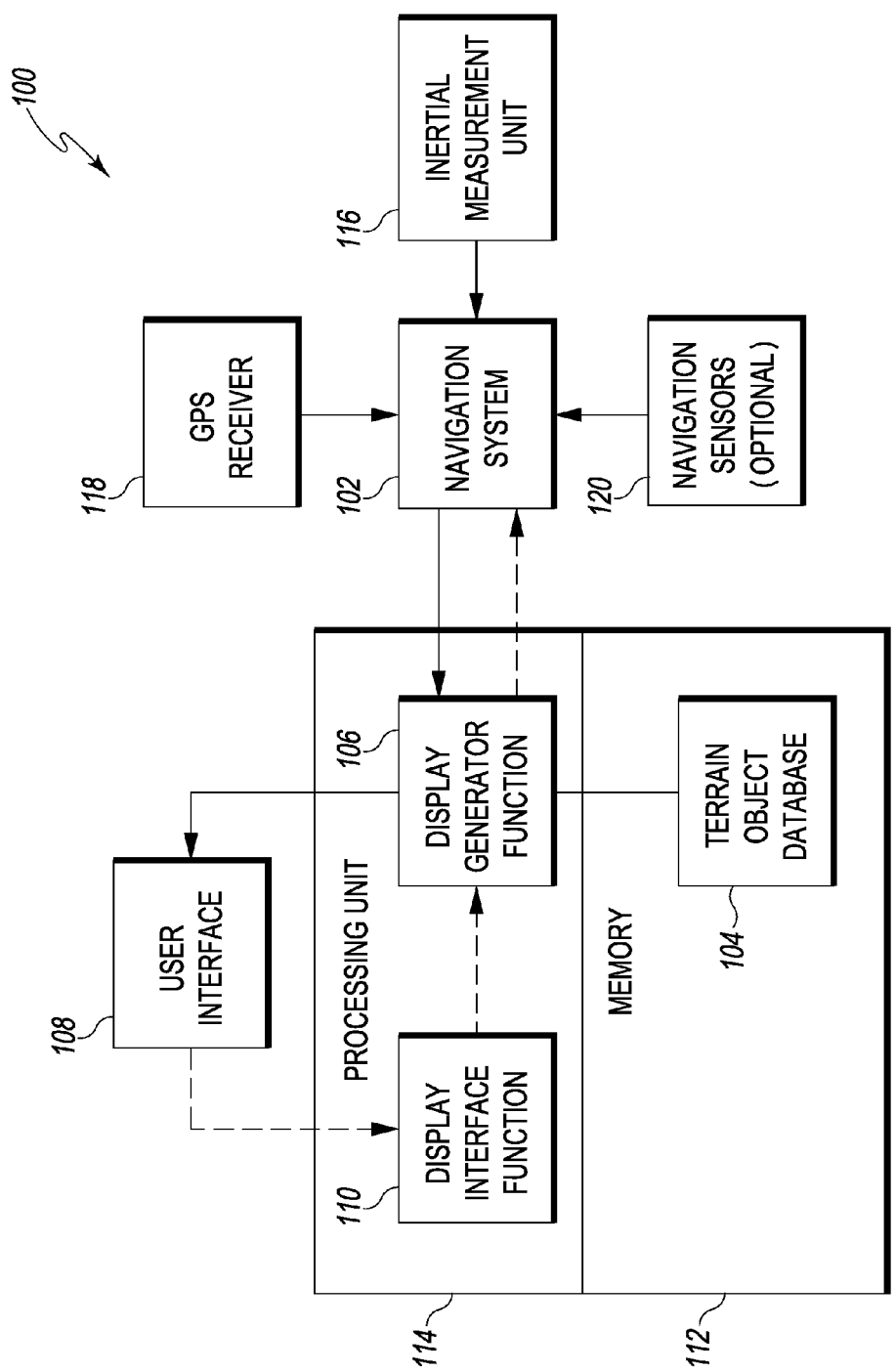
FIG. 1 is a block diagram of one embodiment of a system for providing navigation in a GPS denied environment.

In accordance with common practice, the various described features are not drawn to scale but are drawn to emphasize specific features relevant to the exemplary embodiments.

DETAILED DESCRIPTION

In the following detailed description, references are made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a block diagram of one embodiment of a system 100 for updating a navigational solution in a GPS denied environment. System 100 includes navigation system 102. When navigation system 102 operates, navigation system 102 uses information about current position in conjunction with information gathered from an inertial measurement unit (IMU) 116. IMU 116 includes gyroscopes, accelerometers, and other instrumentation that provide motion information to navigation system 102. Upon receiving the motion information from IMU 116, navigation system 102 calculates a navigation solution, which includes the position, velocity, heading, and attitude of a navigating object. For example, navigation system 102 can calculate the position, velocity, heading, and attitude of an airplane, a boat, a car, and the like. However, as navigation system 102 operates, cumulative errors arise, causing the calculation of the navigation solution to drift away from the true position, velocity, heading, and attitude of the navigating object. In some implementations, to correct the drifting, navigation system 102 receives navigational corrections from the GPS through GPS receiver 118. The navigational corrections received from the GPS, through GPS receiver 118, correct the drifting errors such that navigation system 102 calculates a more accurate navigational solution.

Further, system 100 includes memory 112. Memory 112 includes at least one device that can hold data in a machine readable medium. The machine readable medium can be implemented as any available media that can be accessed by a general purpose or special purpose computer or processor, or any programmable logic device. Suitable machine or processor readable media may include storage/memory media such as magnetic or optical media. For example, storage/memory media may include conventional hard disks, Compact Disk—Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Memory 112 stores a terrain object database 104. The phrase "terrain object database," as used herein, refers to a database that stores information describing the terrain through which a navigating object is traveling. For example, terrain object database 104 stores information that describes the terrain of the Earth. When terrain object database 104 stores information to describe the Earth's terrain, terrain object database 104 can store information described by a Digital Terrain model, a Digital Elevation Model, a Vertical Obstruction Database, a digital surface model and the like. In some implementations, terrain object database 104 can store information about regions representing a subset of the earth's terrain. Further, terrain object database 104 resides either on the vehicle or off the vehicle. When terrain object database 104 resides off the vehicle, terrain object database 104 communicates with the vehicle through a communication link to provide information describing the terrain through which a navigating object travels. Also, terrain object database 104 can store information that describes the terrain that is gathered by sensors on board the airplane. Conversely, terrain object database 104 can store information that is loaded into memory 112 from a compilation of terrain information.

System 100 also includes a processing unit 114. Processing unit 114 includes at least one electronic device that accepts data and performs mathematical and logical operations. Processing unit 114 includes or functions with software programs, firmware, or other computer readable instructions for carrying out various methods, process tasks, calculations, and control functions used in implementing the functionality described below. These instructions are typically stored on any appropriate computer or machine readable medium used for storage of computer readable instructions or data structures, such as memory 112.

Processing unit 114 includes a display generator function 106. The phrase "display generator function," as used herein, refers to a function performed by a processor that uses the information stored in the terrain object database 104 and the navigational solution to generate displayable information that, when displayed, produces a model of the terrain of the environment through which the navigating object travels. For example, navigation system 102 provides a navigational solution to display generator function 106. Using the navigation solution, display generator function 106 acquires information from terrain object database 104 in memory 112 to create displayable information representing the view from the navigating object with the position, heading, velocity, and attitude described by the navigation solution. In one implementation, where the navigating object is an airplane, display generator function 106 uses the navigation solution from navigation system 102 in conjunction with information from terrain object database 104 to generate displayable information representing the view a pilot of the airplane would have if the pilot were to look through the window of the airplane.

System 100 further includes a user interface 108. User interface 108 receives the displayable information from display generator function 106 and creates a visual display for a user. For example, again where the user is a pilot of an airplane, user interface 108 displays a three-dimensional view of the terrain that corresponds with the view of the pilot from the airplane. In an airplane, the user interface 108 can be located on a control panel, above a window, on a head mounted display, and the like. When user interface 108 solely provides a display to the user based on the navigation solution, user interface 108 functions as a display unit of the terrain that is visible to the pilot.

In some implementations, display generator function 106 adds symbology information to the displayable information that causes user interface 108 to display, in addition to the terrain, symbology markers that correspond to the view from an object. For example, where the object is an airplane, display generator function 106 adds symbology information to the displayable information that causes user interface 108 to render lines and other markings on the terrain display that correspond to the sides of the window. Display generator function 106 also can add information that corresponds to a boresight, a top window edge, a bottom window edge, a nose of a plane, and the like.

As was discussed above, navigation system 102 receives a GPS signal to correct any errors that arise over time in the navigation solution. However, certain environments can prevent system 100 from receiving a GPS signal. Further, a malfunction in a GPS receiver or intervening interface can also prevent the reception of a GPS signal. In the event that system 100 is operating in a GPS-denied environment, system 100 can receive data from navigations sensors 120. Navigation sensors 120 provide alternative systems to acquire data that can be used to correct errors that arise in navigation system 102. For example, navigation sensors 120 include sensors, like radar, lidar, and the like. Navigation system 102 can use the information acquired by navigation sensors 120 to correct errors that arise in navigation system 102 surrounding environment and ascertain the location of system 100. However, sensors in navigation sensors 120 can be expensive and may not be widely available to all aircraft. Therefore, as navigation sensors 120 is not available in all aircraft, alternative means of correcting the errors that arise in the navigation solution may be needed in GPS-denied environments.

To acquire corrective information for navigation system 102 when system 100 operates in a GPS-denied environment, system 100 decouples user interface 108 from display generator function 106. The term, "decouple," as used herein, refers to the alteration of the functionality of user interface 108 such that the position of the terrain that is displayed on user interface 108 is not exclusively determined by the navigation solution calculated by navigation system 102. For example, in an environment where a GPS signal is available, display generator function 106 determines the displayable terrain based on the navigation solution received from navigation system 102. In contrast, when system 100 is in a GPS-denied environment, display generator function 106 uses the navigational solution in conjunction with information acquired by user interface 108 to determine what information should be read from terrain object database 104 but user interface 108 allows a user to make position adjustments to the terrain model on user interface 108 to more accurately represent the view from the navigating object. Thus, when user interface 108 is decoupled from display generator function 106, the terrain that is displayed on user interface 108 is determined by the navigation solution calculated by navigation system 102 and position adjustments made to the display by a user of system 100. Alternatively, a user can also make position adjustment to the display when system 100 is operating in an environment where GPS corrections are available.

As a navigation system 102 develops errors over the course of operation in a GPS-denied environment, the terrain displayed on user-interface 108 will drift away from the actual terrain viewed by a user. When the user makes position adjustments on user interface 108, the user can adjust the terrain displayed on user interface 108 such that the terrain displayed on user interface 108 matches the view of a user through a window or other field of view. The phrase "position adjustment," as used herein, refers to an adjustment made on user interface 108 that changes what terrain is displayed on user interface 108. In some implementations, user interface 108 displays a terrain image on a touch screen monitor. One having skill in the art would appreciate that when the terrain is displayed on a touch-screen, a user can adjust what terrain is displayed on the touchscreen by touching the screen and moving the image until the terrain image on the display matches the view of the user from the navigating object. In other implementations, a user can make position adjustments through bezel button bumps, cursor control, and the like.

When a user makes a position adjustment on user interface 108, user interface 108 sends a record of the position adjustments to a display interface function 110 in processing unit 114. Display interface function 110 is a function of processing unit 114 that uses the record of the position adjustments made on user interface 108 to calculate an updated position for the navigating object. For example, a user may make a position adjustment to the display on user interface 108 that represents a change in the altitude of the navigating object. Display interface function 110 uses the position adjustment that represents a change in altitude to calculate a new altitude for the navigating object.

When display interface function 110 calculates an updated position for the navigating object, display interface function 110 transmits the updated position to display generator function 106. Display generator function 106 uses the updated position to create new displayable information for updating the display on user interface 108. For example, display generator function 106 receives an updated position from display interface function 110. Upon receiving the updated position from display interface function 110, display generator function 106 acquires new terrain information from terrain object database 104 and generates new displayable information that, when rendered by user interface 108, will display the terrain as viewed from the updated position. Further, in some embodiments, display generator function 106 updates the displayable information rendered by user interface 108 in real time. For example, when a user makes position changes on user interface 108, the position changes appear to happen with little to no delay from the viewpoint of the user. In some implementations, display generator function 106 generates displayable information that represents a terrain that is larger than the area viewable by a user. By generating a larger terrain, the user can move the terrain model on the terrain display without waiting for display generator function 106 to generate new displayable information.

Further, when display generator function 106 receives an updated position from display interface function 110, display generator function 106 transmits the updated position to navigation system 102. The navigation solution calculated by navigation system 102 develops errors over time when navigation system 102 operates without receiving corrective information. Upon reception of the updated position from display generator function 106, navigation system 102 uses the updated position to correct errors that have developed during operation.

Figure 2:
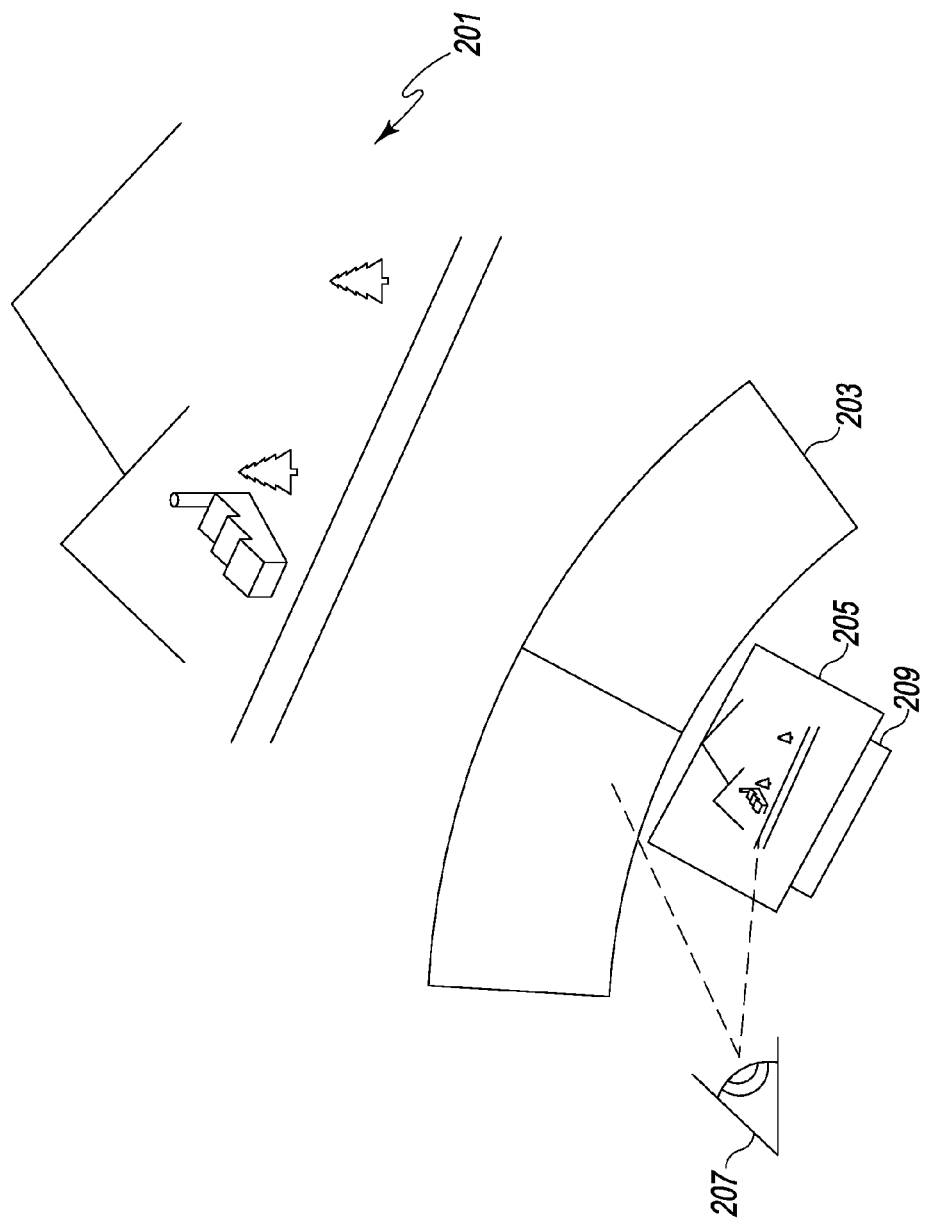
FIG. 2 is a block diagram illustrating the use of a system for providing navigation in a GPS denied environment according to one embodiment.

FIG. 2 illustrates an exemplary implementation of system 100. In some implementations, during the navigation of an object, the navigating object provides a terrain display 205 to a user 207. Terrain display 205 is part of user interface 108 in FIG. 1 as described above. Terrain display 205 displays a terrain model to user 207 that represents external scene 201. The phrase "external scene," as used herein, refers to the terrain that user 207 sees when looking at the environment surrounding the navigating object. For example, when user 207 is a pilot flying an airplane, external scene 201 would be the pilot's view of the world looking through viewing pane 203 of the airplane at the surrounding environment. Viewing pane 203 can be the window at the front of a vehicle, where external scene 201 is the view of user 207 looking over the front of the vehicle. Alternatively, viewing pane 203 can be a side window of a vehicle, where external scene 201 is the view of user 207 looking through the side window of the vehicle. Further, Viewing pane 203 can provide user 207 a view through the top, bottom, and rear of the vehicle. In some implementations, Viewing pane 302 includes a plurality of views from the airplane. For example, Viewing pane 203 provides user 207 a combination of views that includes views through at least one of a view through the front, side, bottom, top, and back of the vehicle.

When the navigating object travels through an environment that is GPS-denied, as described above in relation to FIG. 1, user interface 108 decouples from navigation system 102 and a position adjuster 209 becomes active. Position adjuster 209 is an apparatus that allows a user 207 to adjust the terrain model, rendered in terrain display 205, so that it matches user 207's view of external scene 201 through a viewing pane 203, where viewing pane 203 is a window, a hole, another image created by a sensor, and the like. As was mentioned previously, position adjuster 209 can be a touchscreen, bezel button bumps, cursor control, and the like. As user 207 adjusts the rendered image on terrain display 205 by controlling position adjuster 209, user interface 108 in FIG. 1 passes information describing the position adjustments to display interface function 110. Display interface function 110 uses the position adjustments to calculate a new position for the vehicle and update navigation system 102 as described above.

In some implementations, when the navigating object is in a GPS-denied environment, user interface 108 in FIG. 1 periodically prompts user 207 in FIG. 2 to adjust the position of the rendered scene on terrain display 205. For example, when a user 207 adjusts the position of the rendered scene on terrain display 205, display interface function 110 in FIG. 1 resets a timer. When the timer expires, user interface 108 prompts user 207 to adjust the rendered scene. User interface 108 prompts user 207 by using a flashing light, a text box that appears on terrain display 205, an auditory signal, and the like.

As was mentioned above, display generator function 106 can add information to the rendered scene on terrain display 205 that corresponds with the view from a navigating object. For example, where the object is an airplane, display generator function 106 adds information to the displayable information that causes user interface 108 to render lines on terrain display 205 that correspond to the sides of a window. In an alternative implementation, terrain display 205 provides markings that correspond to elements of the navigating object that are in the field of view of user 207. For example, terrain display 205 can have a boresight marking, a series of lines corresponding to window edges, a marking corresponding to the nose of the airplane, and the like. Terrain display 205 can also display a combination of multiple different markings representing features in the field of view of user 207. The markings, whether they appear on terrain display 205 or whether they are added to the rendered scene by display generator function 106, aid user 207 in aligning the rendered scene on terrain display 205 with external scene 201 as viewed from the navigating object.

Figure 3A:
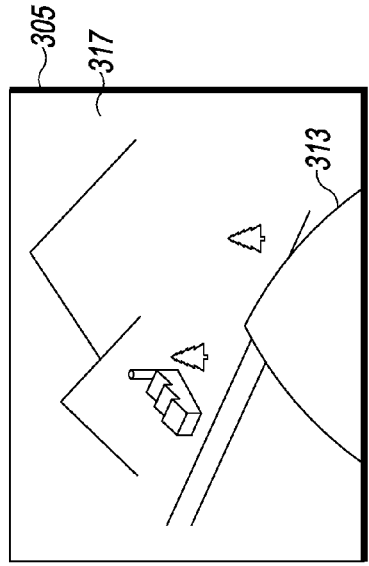
FIGS. 3A-C are diagrams illustrating rendered information on a terrain display with added symbologies according to one embodiment.
Figure 3B:
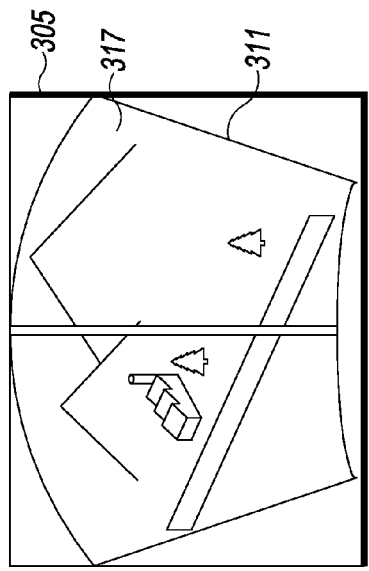
Figure 3C:
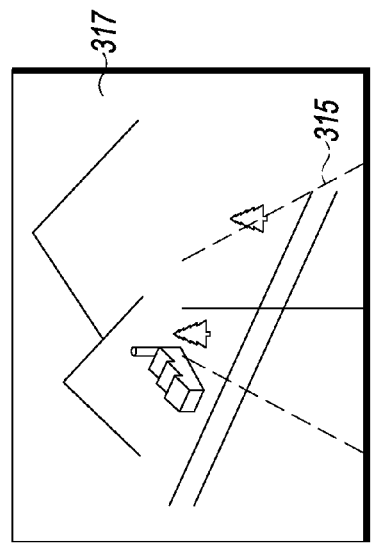

FIGS. 3A-C are diagrams illustrating rendered information on a terrain display with added symbologies. FIG. 3A illustrates a terrain display 305 with information displayed to show a rendered scene 317 through the added symbology of window boundaries 311. For example, as the user looks at rendered scene 317 displayed on terrain display 305, window boundaries 311 are added to the rendered scene 317 to mimic the view of a user that is looking through the windows of a vehicle at an external environment. Window boundaries 311 aid the user in aligning the rendered scene 317 with the external environment when collecting position adjustments for correcting the navigation system.

FIG. 3B illustrates a terrain display 305 with information displayed to show a rendered scene 317 in relation to an external feature 313 of a vehicle. For example, as the user looks at rendered scene 317 from the vehicle, an external portion of the body of the vehicle can be added to rendered scene 317 as external feature 313. External feature 313, like window boundaries 311 of FIG. 3A, is added to rendered scene 317 to mimic the view of a user that is looking at an external environment from the vehicle. Also similar to window boundaries 311, external feature 313 aids the user in aligning the rendered scene 317 with the external environment when collecting position adjustments for correcting the navigation system.

FIG. 3C illustrates a terrain display 305 with information displayed to show a rendered scene 317 in relation to navigational guidance information 315. For example, as the user looks at rendered scene 317 from the vehicle, navigational guidance information 315 can be added to rendered scene 317. Navigational guidance information 315 includes information that allows the user to align rendered scene 317 with the view of the external environment from the vehicle when collecting position adjustments for correcting the navigation system.

Figure 4:
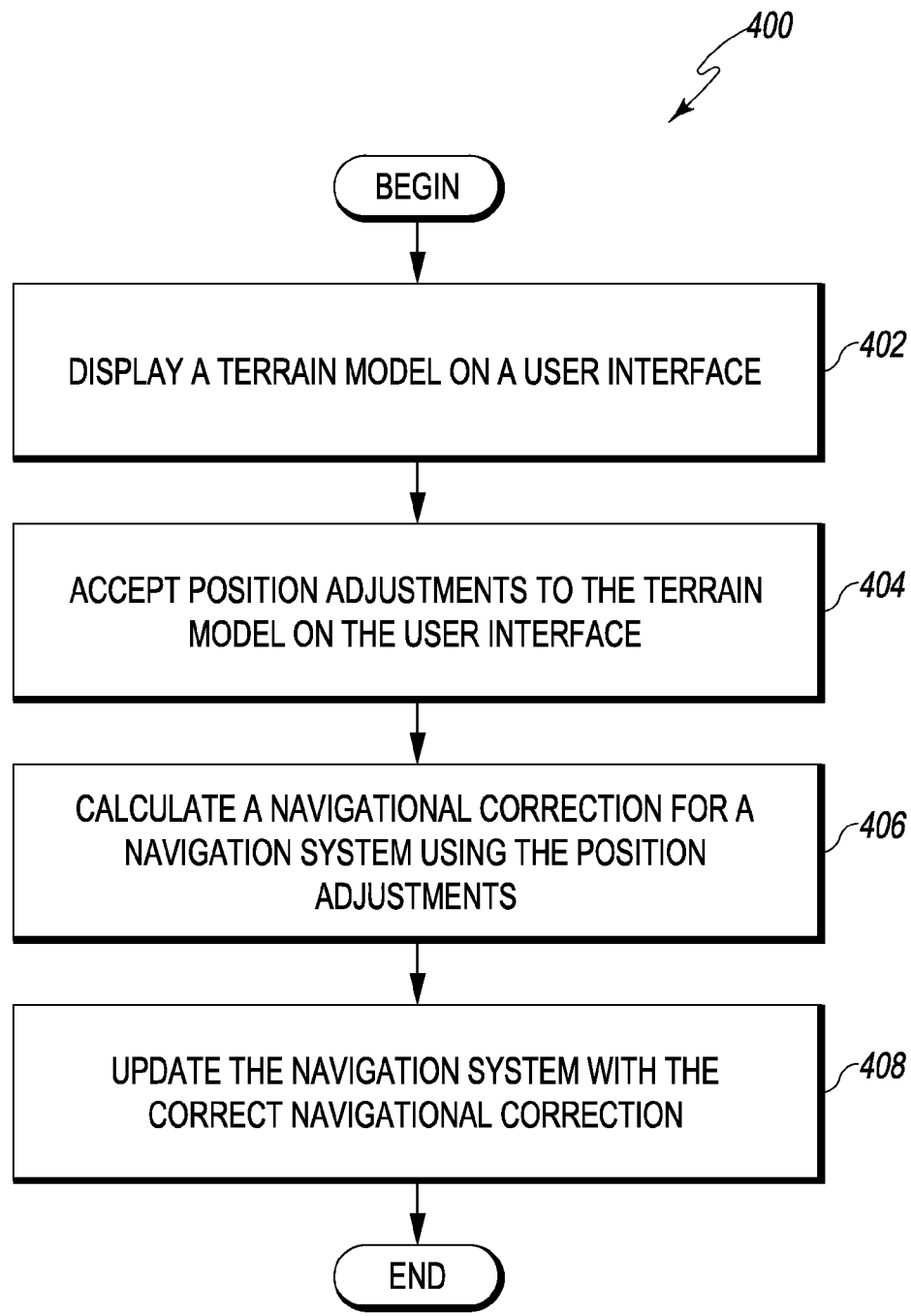
FIG. 4 is a flow diagram illustrating one embodiment of a method for providing navigation in a GPS denied environment.

FIG. 4 is a flow diagram illustrating a method 400 for acquiring navigation information in a GPS denied environment. At block 402, a terrain model is displayed on a user interface. For example, a display generator acquires a navigation solution from a navigation system indicating a position of a navigating object. Using the navigation solution, the display generator accesses a terrain object database to acquire information describing the viewable terrain from a navigation object with the calculated navigation solution. The display generator uses this information to render a terrain model. A user interface uses the information received from the display generator to display the terrain model to a user. At block 404, position adjustments to the terrain model are accepted on the user interface. For example, as the terrain model is based on a navigation solution received from the navigation system and the navigation system is not receiving navigation corrections because the navigating object is in a GPS-denied environment, the navigation system will progressively accumulate errors. The accumulating errors cause the terrain model displayed on the user interface to drift away from accurately representing the viewable terrain. To correct the accumulating errors, the user interface accepts position adjustments to the terrain model on the user interface.

At block 406, a navigational correction is calculated for the navigation system using the position adjustments. For example, the display interface processor receives the position adjustments from the user interface, calculates a corrected position, and transmits the corrected position to the display generator. The display generator updates the terrain model and transmits the corrected position to the navigation system. At block 408, the navigation system is updated with the navigational correction.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed:

1. A method for updating a navigation system, the method comprising:
displaying a terrain model on a user interface, the terrain model being generated from data in a terrain database, wherein the terrain model is a representation of a view from a navigating object;
accepting position adjustments to the terrain model on the user interface, wherein the position adjustments are made by adjusting the representation of the view from the navigating object on the user interface relative to the view of a user from the navigating object;
calculating via a processor a navigational correction for the navigation system using the position adjustments; and
updating a navigation solution for the navigation system with the navigational correction.

2. The method of claim 1, the method further comprising:
determining that a GPS navigational correction is unavailable; and
when the GPS navigation correction is unavailable, decoupling the user interface from the navigation solution such that the position of the terrain that is displayed on the user interface is not exclusively determined by the navigation solution from the navigation system.

3. The method of claim 1, wherein displaying the terrain model on the user interface comprises applying a symbology that aids the user in correctly adjusting the display.

4. The method of claim 3, wherein the symbology comprises at least one of:
a boresight symbol applied to the display that corresponds to a boresight of a vehicle; and
a marking applied to the display that corresponds to a window boundary of the vehicle.

5. The method of claim 1, wherein the displayed terrain model represents a terrain within a field of view for the user.

6. The method of claim 1, wherein the terrain database stores a digital elevation model.

7. The method of claim 1, wherein the position adjustments are made using at least one of:
a button interface;
a mouse interface; and
a touchscreen interface.

8. The method of claim 1, further comprising periodically prompting the user to make position adjustments.

9. The method of claim 1, wherein the terrain model is presented in three-dimensional space.

10. A system for updating a navigation system, the system comprising:
a navigation system configured to provide a navigational solution;
at least one memory device configured to store a terrain object database, the terrain object database storing information that describes a terrain;
a user interface configured to display a terrain model and receive position adjustments from a user, wherein the user interface displays the terrain model as a representation of a view from a navigating object and the position adjustments are made by adjusting the representation of the view from the navigating object on the user interface relative to the view from the navigating object; and
a processing unit configured to generate displayable information for displaying the terrain model using the information stored on the at least one memory device and the navigational solution, and calculate corrections to the navigational solution from the position adjustments and transmit the corrections to the navigation system.

11. The system of claim 10, wherein the processing unit is further configured to:
determine that a GPS navigational correction is unavailable to the navigation system; and
when the GPS navigation correction is unavailable, decouple the user interface from the navigation solution so that the displayable information is based on the navigational solution and the received position adjustments.

12. The system of claim 10, wherein the processing unit applies symbology information to the displayable information.

13. The system of claim 12, wherein the symbology information comprises at least one of:
a boresight symbol applied to the display that corresponds to a boresight of a vehicle; and
a marking applied to the display that corresponds to a window boundary for the vehicle.

14. The system of claim 10, wherein the displayed terrain model represents the terrain within a field of view for the user.

15. The system of claim 10, wherein the at least one memory device stores a digital elevation model.

16. The system of claim 10, wherein the user interface is further configured to periodically prompt the user to make the position adjustments.

17. The system of claim 10, wherein the processing unit is configured to generate the displayable information that describes an area larger than an area viewable by a user on the user interface.

18. A program product comprising a non-transitory processor-readable medium on which program instructions are embodied, wherein the program instructions are configured, when executed by at least one programmable processor, to cause the at least one programmable processor to:
display a terrain model on a user interface, the terrain model being generated from data in a terrain database, wherein the terrain model is a representation of a view from a navigating object;
receive position adjustments to the terrain model from the user interface, wherein the position adjustments are made by adjusting the representation of the view from the navigating object on the user interface relative to the view of a user from the navigating object;
calculate a navigational correction for a navigation solution using the position adjustments; and
transmit the navigational correction to a navigation system.

19. The program product of claim 18, wherein the program instructions are further configured to cause the at least one programmable processor to:
determine that a GPS navigational correction is unavailable; and
decouple the user interface from the navigation solution so that the user interface accepts position adjustments.

20. The program product of claim 18, wherein the program instructions are further configured to cause the at least one programmable processor to:
apply a symbology to the displayable information, wherein the symbology guides the user when making the position adjustments.

* * * * *